Jan. 26, 1965   J. E. DRAIM   3,166,979
ROCKET IGNITER AND DAMPING PLATE ASSEMBLY
Filed Feb. 8, 1963

INVENTOR.
JOHN EMERY DRAIM
BY
ATTORNEYS

United States Patent Office
3,166,979
Patented Jan. 26, 1965

3,166,979
ROCKET IGNITER AND DAMPING PLATE ASSEMBLY
John Emery Draim, % Heavy Attack Squadron 5, Fleet Post Office, New York, N.Y.
Filed Feb. 8, 1963, Ser. No. 257,345
6 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to a rocket igniter and damping plate assembly and more particularly to an assembly for quickly installing or removing a rocket igniter and/or damping plate from a nozzle end of a rocket engine.

In many rocket engines it is generally desirable to keep the igniter separate from the engine until such time that the engine is being readied for operation. The reason for the separation is for safety considerations as well as allowing a check out of the igniter prior to installation. Some of the prior art methods of installation of an igniter within a rocket engine have been to thread or clamp the igniter to a metallic boss integral to the rocket casing or raising the igniter within the casing on a string-pulley arrangement. These methods as well as other presently known methods are time consuming and require special assembly tools such as torque wrenches, clamps, spreaders and so forth. Should it be desired to remove the igniter after it is once installed for such purposes as check out or a change in plans of operating the engine the reverse procedure must be performed in order to separate the igniter from the engine. A prime disadvantage of the prior art igniter assemblies is that they are fixed in place to the rocket engine and must necessarily remain with the engine after ignition. Accordingly, the weight of the firing assembly as well as the components that are employed to fix it in place add to the mass of the rocket engine so as to lower the propellant mass fraction and consequently affect the over-all performance of the rocket engine.

The present invention overcomes these problems by providing an assembly in which the igniter can be easily installed or removed and which after ignition of the engine is quickly dispelled therefrom. This is accomplished by mounting the igniter to an inflatable bag in such as manner that when the bag is inflated within a nozzle of the engine the igniter will be prepositioned for ignition purposes. The bag can be made to have a shape corresponding to the inner surface of the nozzle on both sides of a nozzle construction so that when the bag is inflated within the nozzle in its corresponded position the igniter is automatically positioned in its design location. The bag is constructed of a material that is destructible by either the explosion of the igniter or the propellant within the engine so that upon firing the engine the bag is destroyed and the igniter is automatically expelled from the engine, thereby relieving the engine of the burden of the weight of the igniter. In addition the invention contemplates the addition of a damping plate mounted to a bottom portion of the bag which is to be used for damping up and down movement of the rocket engine when disposed within water that has wave action. This damping plate can be used in addition to the igniter or in some instances it may be desirable to merely employ the bag and plate combination without the igniter.

An object of the present invention is to provide an assembly for quickly installing and/or removing an igniter from a rocket engine.

Another object is to provide an assembly including an igniter for a rocket engine which is automatically dispelled from the engine upon its ignition.

A further object is to provide an assembly including an igniter for a rocket engine which upon installation in the engine automatically positions the igniter in a designed location.

Yet another object is to provide an assembly including a damping plate for a water launchable rocket engine which can be easily installed or removed from the engine.

A still further object is to provide an assembly including a damping plate which upon installation in the rocket engine automatically positions the dampening plate in a designed location.

A still further object is to provide an assembly including an igniter and a damping plate for a water launchable rocket engine which can be easily installed or removed from the engine.

Yet another object is to provide an assembly including an igniter and a damping plate for a water launchable rocket engine which upon installation automatically prepositions the igniter and the damping plate in designed locations, and upon ignition the entire assembly is automatically separated from the rocket engine.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
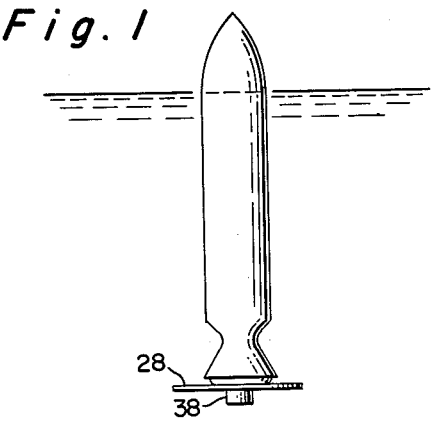
FIG. 1 is a side view of a missile floating in water with the igniter and damping plate assembly installed.
Figure 2:
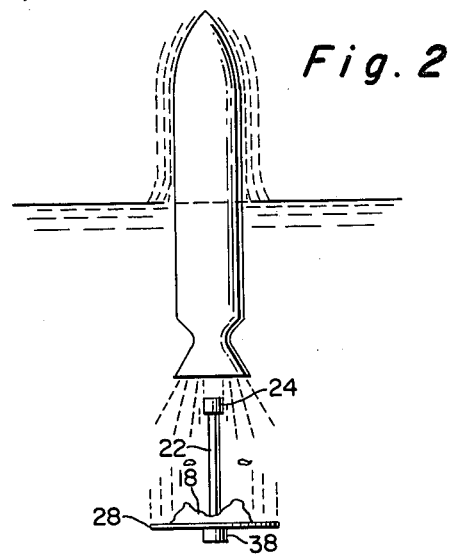
FIG. 2 is a side view of the missile and the igniter and damping plate assembly after ignition of the missile's rocket engine.
Figure 4:
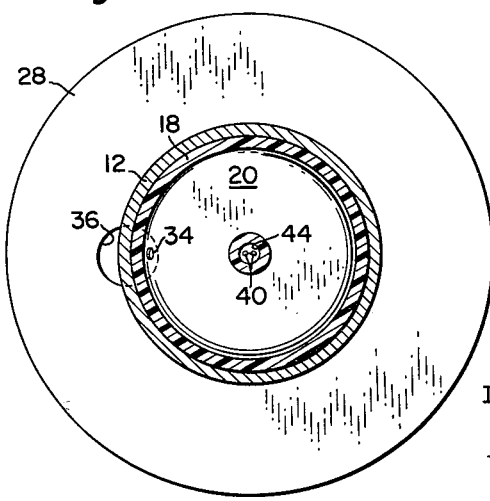
FIG. 4 is a cross sectional view taken along lines IV—IV of FIG. 3.
Figure 3:
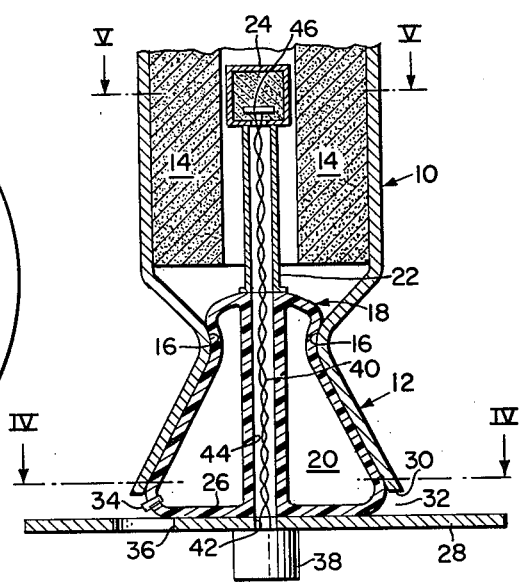
FIG. 3 is a partial sectional view of the missile showing the igniter and damping plate assembly as well as the missile's rocket engine.
Figure 5:
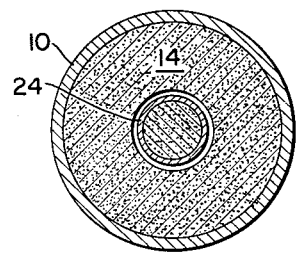
FIG. 5 is a cross sectional view taken along line V—V of FIG. 3.

Referring now to the drawings wherein like reference numerals designate like or corresponding parts throughout the several views, there is shown in FIG. 1 a floatable missile capable of floating in an upright position. The missile has a rocket engine 10, the rocket engine having a nozzle 12 and an annular propellant grain 14 and the nozzle 12 having a constriction 16 between its inlet and its outlet. Disposed within the nozzle is a bag 18 constructed of a destructible material such as rubber or plastic and which is inflated with a fluid such as air 20. The bag 18 is shaped upon inflation to engage the inner peripheral surface of the nozzle 12 on both sides of the constriction 16 so as to make a seal between the nozzle's inlet and outlet and also resist longitudinal movement within the nozzle.

Bonded to an upper end of the bag 18 is a tube 22 which extends into the opening within the propellant grain 14 and rigidly supports an igniter 24 for igniting the propellant grain 14. The mounting of the tube 22 to the bag 18 and the length of the tube 22 is to be such that when the bag 18 is inflated within the nozzle 12 with its shape corresponded to the interior surface shape of the nozzle 12 the igniter 24 is automatically positioned in a designed location for ignition purposes.

The bag 18 has a flat bottom end 26 to which is mounted a circular plate 28, the plate 28 extending laterally beyond the sides of the missile so as to dampen up and down movement of the missile when the missile is floating in water presenting wave action. The bottom end 26 of the bag 18 extends below a bottom edge 30 of the nozzle 12 so as to form an annular space 32 therebetween. The bag 18 has a valve 34 adjacent the space 32 for permitting inflation and deflation of the bag 18. The plate 28 has an opening 36 adjacent the valve 34 for allowing access to the valve 34 from the bottom side of the assembly.

A firing circuit 38 is sealingly mounted at the bottom of the plate 28 and has leads 40 extending through an opening 42 within the plate 28, thence through an opening 44 within the bag 18 and thence through the tube 22 into the igniter 24 where the leads are electrically connected to a detonator 46. The firing circuit 38 may be of many various types such as a radio receiver capable of receiving a signal from a remote transmitting station so as to close a relay for furnishing battery power to the leads 40, which in turn will actuate the detonator 46 and ignite the igniter 24.

The material of the bag 18 and its thickness is to be preferably such that the bag is immediately ruptured by gases generated by the rocket engine 10 upon its firing. This rupture will collapse the bag 18 allowing the force of the gases to expel the entire apparatus from the rocket engine 10. When the missile is to be employed in water the material is to be preferably impervious. Examples of a suitable material for the bag 18 would be rubber or plastic. It is to be emphasized that the bag 18 even when inflated outside of the nozzle 12 has a shape which generally conforms to the interior surface of the nozzle, that is that the bag has a constriction similar to the constriction 16 of the nozzle 12 so that the bag will engage the interior surface of the nozzle 12 on both sides of the constriction 16. The degree of engagement of the bag 18 and the nozzle 12 on both sides of the constriction 16 and the amount of fluid pressure within the bag 18 is a design feature but preferably should be sufficient to withstand any substantial movement of the entire combination with respect to the rocket engine 10.

In the operation of the device the bag 18 is disposed within the nozzle 12 with the igniter 24 extending within the propellant grain 14. The bag 18 is gradually inflated to insure that its inflated shape will be corresponded with the interior shape of the nozzle 12. Upon a mating engagement of the constriction of the bag 18 with the constriction 16 of the nozzle 12 the bag is further inflated to a pressure that will prevent any substantial longitudinal movement of the combination within the nozzle. The igniter 24 and the damping plate 28 are now automatically positioned in their designed locations and the rocket engine is readied for employment, as shown in FIG. 1. A remote station then transmits a signal to the firing circuit 38 which causes the igniter 24 to ignite the rocket propellant 14, after which the rocket engine 10 commences its operation. The gases generated by the burning of the propellant 14 ruptures the bag 18 causing the bag 18 to collapse and be forced out through the nozzle 12 carrying with it the igniter 24 and the damping plate 28. Accordingly, the igniter 24 and the damping plate 28 are eliminated from the missile after launch, thus increasing the overall efficiency of the missile. Should there be a change in plans concerning the launching of the missile after installation of the combination the igniter 24 and damping plate 28 can be easily removed by deflating the bag 18 and withdrawing the combination from the rocket engine 10.

While in the preferred embodiment the bag 18 supports the combination of the igniter 24 and the damping plate 28 it is to be understood that it is within the scope of the invention to include either one of these components separately with the bag 18. The combination of the bag with the igniter 24 without the damping plate 28 is intended to be used for either water launch or land launch. In a land launch the bag 18 need not make a water tight seal with the nozzle 12 but in such an instance would have a primary purpose of positioning the igniter 24 in its designed location within the propellant grain 14. Of course any embodiment employing the damping plate would primarily be intended for use in a water launch of the missile.

Should the nozzle 12 be of a type wherein it is substantially a straight pipe without any constriction similar to the constriction 16 of the nozzle 12 it is intended that the bag 18 be inflated to such a pressure that its frictional engagement with the nozzle 12 will support the igniter 24 and damping plate 28. In some rocket engines such as the end burning type it may be desirable to mount the igniter 24 directly to the bag 18, thus doing away with the tube 22. Further the igniter 24 and the firing circuit 38 may be all in one package and attached to the upper end of the bag 18 so as to eliminate the opening 44 within the bag 18 and the opening 42 within the damping plate 28.

Obviously many modifications and variations of the present invention are possible in the light of the above teachings. It is therefore to be understood, that within the scope of the appended claims, the invention may be practiced otherwise and as specifically described.

I claim:
1. A closure for use in a rocket engine having a combustion chamber and a discharge nozzle with a constricted throat portion comprising:
   an inflatable bag shaped upon inflation to conform to said nozzle on opposite sides of said throat portion and resist displacement therefrom;
   means for inflating said bag after insertion into the nozzle;
   said bag upon inflation snugly conforming to the interior walls of said nozzle; and
   a rocket engine igniter mounted on and centrally positioned by an end of said bag, said igniter to extend into said combustion chamber;
   said bag being deformable by a selected minimum pressure in said combustion chamber whereby forceful expulsion of the bag and the igniter is obtained upon firing of the igniter and combustion of the rocket engine propellant.

2. In an elongate rocket engine launchable from a floating position in a body of water with its nozzle submerged below the surface of the water so as to exhaust in a substantially downward direction, said nozzle having an inlet and an outlet, an apparatus comprising:
   (a) an impervious inflated bag disposed within said nozzle and engaging an interior surface of the nozzle so as to make a seal between said inlet and said outlet and resist longitudinal movement with respect to said engine, said bag having a valve for use in inflating and deflating said bag from an exterior position of said nozzle; and
   (b) a plate mounted at a bottom end of the bag and extending laterally beyond outer sides of the engine, said bag being made of a material destructible by exhaust gases generated upon firing of said engine; whereby upon disposing the engine with said apparatus in the water the plate dampens the tendency of the engine to move up and down in the water when there is wave action.

3. In an elongate rocket engine launchable from a floating position in a body of water with its nozzle submerged below the surface of the water so as to exhaust in a substantially downward direction, said nozzle having an inlet and an outlet, an apparatus comprising:
   (a) an impervious inflated bag disposed within said nozzle and engaging an interior surface of the nozzle so as to make a seal between said inlet and said outlet and resist longitudinal movement with respect to said engine; said bag being made of a material destructible by exhaust gases generated upon firing of said engine;
   (b) a plate mounted at a bottom end of the bag and extending laterally beyond outer sides of the engine so that said plate will dampen the tendency of the engine to move up and down in the water when there is wave action;

(c) said plate being spaced from a bottom edge of said outlet of the nozzle; and (d) said bag having a valve adjacent the space between the plate and the bottom edge of said exhaust end, whereby said apparatus can be easily installed by positioning the bag within the nozzle in a deflated condition and then inflating the bag by introducing a fluid through said valve and said apparatus can be easily removed from the nozzle by discharging the fluid from the bag through said valve.

4. In an elongate rocket engine launchable from a floating position in a body of water with its nozzle submerged below the surface of the water so as to exhaust in a substantially downward direction and said nozzle having a constriction between an inlet and an outlet thereof, an apparatus comprising:

(a) an inflatable bag which in its inflated state has a shape which substantially conforms to an interior surface of the nozzle on both sides of said constriction;

(b) said bag being disposed within said nozzle in its inflated state with its shape corresponding with the shape of the interior surface of the nozzle so that the bag engages the nozzle on both sides of the constriction to resist longitudinal movement with respect to said engine; said bag being made of a material destructible by exhaust gases generated upon firing of said engine;

(c) an igniter mounted at an upper end of said bag and positioned in a predetermined location for igniting propellant within said engine;

(d) a plate mounted at a bottom end of the bag in a predetermined position and extending laterally beyond outer sides of the engine for damping the tendency of the engine to move up and down in the water when there is wave action; and (e) said bag having a valve for inflating and deflating said bag and located in an exterior position with respect to said engine, whereby said igniter and said plate can be easily installed in their predetermined positions by inflating the bag with its shape corresponded to the interior shape of the nozzle and the igniter and the plate can be easily removed by deflating the bag.

5. In an elongate rocket engine launchable from a floating position in a body of water with its nozzle submerged below the surface of the water so as to exhaust in a substantially downward direction and said nozzle having a constriction between an inlet and outlet thereof, an apparatus comprising:

(a) an inflatable bag which in its inflated state has a shape which substantially conforms to an interior surface of the nozzle on both sides of said constriction;

(b) said bag being disposed within said nozzle in its inflated state with its shape corresponding with the shape of the interior surface of the nozzle so that the bag engages the nozzle on both sides of the constriction to resist longitudinal movement with respect to said engine;

(c) an igniter mounted at an upper end of said bag and positioned in a predetermined location for igniting propellant within said engine;

(d) a plate mounted at a bottom end of the bag in a predetermined position and extending laterally beyond outer sides of the engine for damping the tendency of the engine to move up and down in the water when there is wave action;

(e) said bag having a valve for inflating and deflating said bag and located in an exterior position with respect to said engine so that the igniter and said plate can be easily installed or removed from their predetermined positions; and (f) said bag being constructed of a material that is destructible by gases generated upon firing said engine, whereby upon firing said engine the plate is automatically separated from said engine.

6. In an elongate rocket engine launchable from a floating position in a body of water with its nozzle submerged below the surface of the water so as to exhaust in a substantially downward direction, said nozzle having a constriction between its inlet and its outlet and the engine having an annular solid propellant rocket grain, an apparatus comprising:

(a) an impervious inflated bag disposed within said nozzle and engaging an inner peripheral surface of the nozzle so as to seal the interior of the engine from said water;

(b) said bag further engaging the nozzle on both sides of said constriction so as to resist longitudinal movement of the bag within said nozzle;

(c) said bag having a substantially flat bottom portion;

(d) a flat circular damping plate attached to the bottom portion of said bag and extending laterally beyond the engine's exterior side for damping the tendency of the engine to move up and down in the water when there is wave action;

(e) said bag having a circular hole axially aligned with the engine and extending from the damping plate to an area inside the engine;

(f) a tube attached to the bag inside the engine and aligned with said hole;

(g) said tube extending upward within the engine so as to be located within said propellant grain;

(h) an igniter mounted at the upper end of the tube so as to be in a position to ignite said propellant;

(i) a remotely controlled firing box attached to a bottom of the damping plate below the hole in said bag;

(j) said damping plate having an opening which opens into said hole;

(k) firing leads extending through said tube, the hole in the bag and the opening in the damping plate and connecting said igniter with said firing box so that upon remotely operating said firing box the igniter will ignite said propellant;

(l) said bag being constructed of a material that is destructible by gases generated by the rocket engine upon its ignition so that upon ignition the bag is collapsed to allow gas pressure to expel the entire apparatus from the rocket engine;

(m) said flat portion of the bag extending below the exhaust end of said nozzle so as to space the damping plate equidistant from a bottom edge of said nozzle;

(n) said bag having an air filling valve which is positioned to extend into said space between the bottom edge of the nozzle and said damping plate; and (o) said damping plate having another opening below said air filling valve so that the apparatus can be easily installed or removed from the engine by inserting the apparatus through the nozzle and inflating the bag or deflating the bag and removing the apparatus from the engine respectively.

References Cited by the Examiner
UNITED STATES PATENTS

| 1,707,112 | 3/29 | Browne | 102—3 |
| 2,763,426 | 9/56 | Erwin | 60—35.6 |
| 2,776,623 | 1/57 | Bonner | 102—49 |
| 2,962,184 | 11/60 | Meier | 244—121 |
| 3,009,174 | 11/61 | Davies | 9—8 |
| 3,053,488 | 9/62 | Cox | 60—35.6 |

FOREIGN PATENTS 1,131,560  6/62  Germany.

BENJAMIN A. BORCHELT, *Primary Examiner.*